(12) United States Patent
Nakagawa

(10) Patent No.: US 7,330,441 B2
(45) Date of Patent: Feb. 12, 2008

(54) SIGNAL ROUTING

(75) Inventor: Tomohiro Nakagawa, Tokyo (JP)

(73) Assignee: Nokia Corporation, Espoo (FI)

( * ) Notice: Subject to any disclaimer, the term of this patent is extended or adjusted under 35 U.S.C. 154(b) by 976 days.

(21) Appl. No.: 10/168,586

(22) PCT Filed: Dec. 20, 2000

(86) PCT No.: PCT/IB00/02016

§ 371 (c)(1),
(2), (4) Date: Nov. 13, 2002

(87) PCT Pub. No.: WO01/47181

PCT Pub. Date: Jun. 28, 2001

(65) Prior Publication Data

US 2004/0095891 A1 May 20, 2004

(30) Foreign Application Priority Data

Dec. 22, 1999 (GB) .................................. 9930366.1

(51) Int. Cl.
*H04L 12/56* (2006.01)
(52) U.S. Cl. ..................................... 370/255
(58) Field of Classification Search ................. 370/255
See application file for complete search history.

(56) References Cited

U.S. PATENT DOCUMENTS

| | | | |
|---|---|---|---|
| 6,735,448 B1* | 5/2004 | Krishnamurthy et al. ... | 455/522 |
| 6,810,428 B1* | 10/2004 | Larsen et al. ............... | 709/238 |
| 7,023,818 B1* | 4/2006 | Elliott ......................... | 370/328 |
| 2003/0033394 A1* | 2/2003 | Stine ........................... | 709/222 |
| 2005/0159111 A1* | 7/2005 | Kim et al. .............. | 455/67.14 |
| 2006/0098608 A1* | 5/2006 | Joshi .......................... | 370/338 |

FOREIGN PATENT DOCUMENTS

| WO | WO 98/56140 | 12/1998 |
|---|---|---|
| WO | WO 99/46899 | * 9/1999 |

OTHER PUBLICATIONS

Singh et al., "Power-Aware Routing in Mobile Ad Hoc Networks," 1998.*
David Lundberg, 'Ad hoc Protocol Evaluation and Experiences of Real World Ad Hoc Networking', Uppsala University, Department of Information Technology, 2002, pp. 1-44.*

* cited by examiner

*Primary Examiner*—Melvin Marcelo
(74) *Attorney, Agent, or Firm*—Squire, Sanders & Dempsey, LLP

(57) ABSTRACT

A method for routing communications in a communications system comprising a plurality of communication nodes, each node being capable of transmitting signals to and receiving signals from one or more other nodes, and including a first node, a second node and a plurality of other nodes; the method comprising selecting a route for communications from the first node to the second node by way of at least one of the other nodes on the basis of mobility characteristics and/or energy characteristics of each of the other nodes.

18 Claims, 4 Drawing Sheets

■ Energy available
← Movement vector
↔ Established wireless link

■ Energy available
← Movement vector
↔ Established wireless link

SIGNAL ROUTING

This invention relates to routing of signals between nodes in a communications network, for example a distributed radio communications network.

In conventional communications systems, network entities of the network are arranged hierarchically. FIG. 1 illustrates such a network. Communications terminals 1 (for example mobile telephones) at the lowest level of the hierarchy cannot communicate directly with each other. Instead, each terminal can communicate with a network entity 2 (for example a base station) at a higher level in the hierarchy. Those network entities may be connected via still higher network entities 3 (for example radio network controllers). In order for one terminal to communicate with another a communication path must be established from that terminal up to a higher level network entity and then back down to the other terminal.

Communication protocols such as Bluetooth, HomeRF and IEEE802.15 provide the possibility for direct communication between peer terminals. If two terminals are unable to communicate directly (for example because direct communication between them is obscured, or because the distance between them is too great) then communications between them could be routed by way of other terminals. FIG. 2 illustrates such a system. FIG. 2 shows terminals 10 to 16, which could represent articles such as wrist watches, internet connection units, televisions or printers each fitted with suitable communication hardware. Communications from terminal 10 to terminal 11 are obscured by wall 17. Signals between terminals 10 and 11 can therefore be routed by way of terminals 12 and 13. In this situation terminals 12 and 13 act in effect to relay communications in each direction between terminals 10 and 11. Even if there is no solid obstruction between terminals, the distance between terminals may be such as to prevent direct communication between them, and there again routing via intermediate terminals may be employed.

The decision on which route is to be used for signals between terminals 10 and 11 may suitably be taken by decision-making functionality in the communications hardware of terminals 10 or 11 on the basis of information received from intervening terminals. Each terminal may periodically transmit probing signals which include the terminal's identity. Terminals which receive a probing signal may store the received identity for a limited period of time, so as to maintain a register of terminals with which they can currently communicate. When one terminal needs to communicate with another it checks its register to determine whether it can communicate directly with the other terminal. If not, it enquires of the terminals with which it can communicate whether they can communicate with the other terminal. If they cannot then they make a corresponding enquiry to the terminals with which they can communicate, and so on until a route is found. If a route is found it is reported back to the terminal initiating the communications. If more than one route exists then the decision-making functionality in the initiating terminal or in other terminals along the route decides on the route involving the fewest intermediate terminals, so that the selected route involves the fewest possible hops, so as to keep delays small and use as few resources as possible.

In some circumstances, this form of routing may not be optimal. For example, one of the intermediate terminals in the route that is decided upon may be a battery powered unit, such as a wrist-watch, a significant amount of whose stored power may be drained by being used as an intermediate node. Or one of the intermediate terminals may be moving away from the selected route, which could result in more communication errors or a need to re-route the communications if that terminal moves out of range.

The paper "Minimum Energy Mobile Wireless Networks" (V. Rodoplu and T H Meng, IEEE JSAC, Vol. 17, No. 8, August 1999) discloses another routing strategy which relies on the concept of reducing power consumption by introducing additional nodes into the selected route, the that the route includes more hops. It relies on the fact that signal strength is attenuated as a function of distance in the relation $d^3$ or $d^4$ (where d is distance).

According to one aspect of the present invention there is provided a method for routing communications in a communications system comprising a plurality of communication nodes, each node being capable of transmitting signals to and receiving signals from one or more other nodes, and including a first node, a second node and a plurality of other nodes; the method comprising selecting a route for communications from the first node to the second node by way of at least one of the other nodes on the basis of mobility characteristics and/or energy characteristics of each of the other nodes.

According to a second aspect of the present invention there is provided a communications system comprising: a plurality of communication nodes, each node being capable of transmitting signals to and receiving signals from one or more other nodes, and including a first node, a second node and a plurality of other nodes; and routing means for routing communications-from the first node to the second node by way of at least one of the other nodes on the basis of the mobility and/or the available energy of each of the other nodes.

According to a third aspect of the present invention there is provided a communication terminal for operation as a first node in a communications system comprising a plurality of communication nodes, each node being capable of transmitting signals to and receiving signals from one or more other nodes, and including a second node and a plurality of other nodes; the terminal including routing means for routing communications from the first node to the second node by way of at least one of the other nodes on the basis of the mobility and/or the available energy of each of the other nodes.

The said method preferably comprises routing communications from the second node to the first node by way of at least one of the other nodes on the basis of mobility characteristics and energy characteristics of each of the other nodes. Those other nodes need not be all the nodes of the communication system. For example, the other nodes may be a set of nodes of the communication system that are capable of providing steps in at least one available route from the first node to the second node. The members of that set may be reported to the first node in response to a probing enquiry initiated by that node. The said routing of communications from the second node to the first node may be performed independently of routing of communications from the first node to the second node.

The mobility characteristics may include the current velocity of each of the other nodes and/or the current direction of each of the other nodes.

The energy characteristics may include the energy available to each of the other nodes, preferably the energy available to each of the other nodes for transmission of signals to other nodes and or reception of signals from other nodes. The energy characteristics may include the power required for transmission and/or reception of signals to/from those other nodes, and/or from/to each node to/from the next in an available route. The said power may be estimated, for example as a function of the distance between the nodes. Where the node is battery-powered—in which case the node may comprise a battery—the energy characteristic for it may be an estimate of the energy stored in the battery. The energy characteristic may be indicative of the node's expected operating lifetime on its current power source.

The said signals may be wireless signals, for example radio signals. The system is preferably an LPRF (low power radio frequency) communication system. The system may suitably, but without limitation, be operable according to any of the Bluetooth, HomeRF or IEEE 802.15 protocols.

Each node may represent a communication terminal of the system. The nodes may be peer nodes in the network.

The present invention will now be described by way of example with reference to the accompanying drawings, in which.

Figure 1:
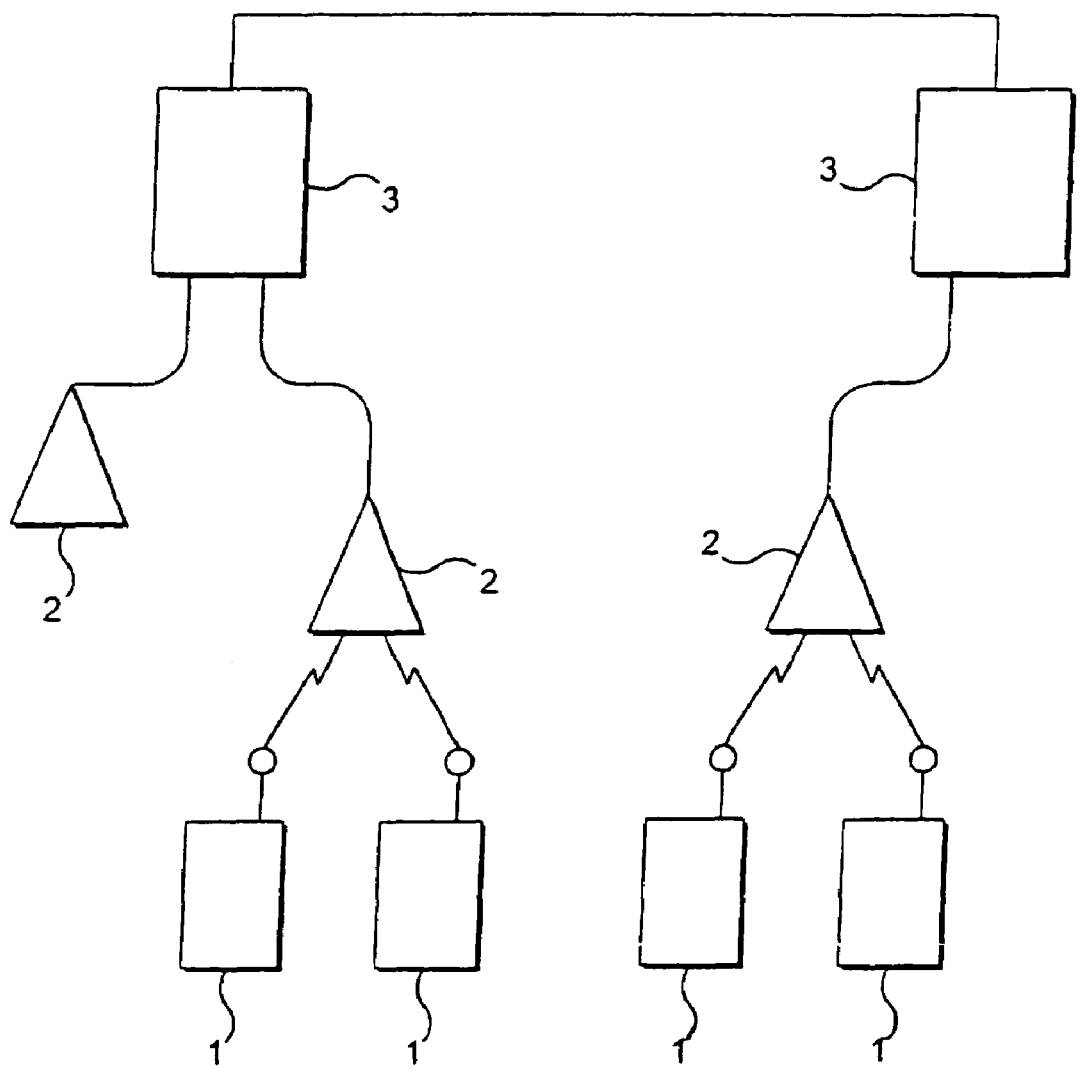
FIG. 1 illustrates a hierarchical network architecture.
Figure 2:
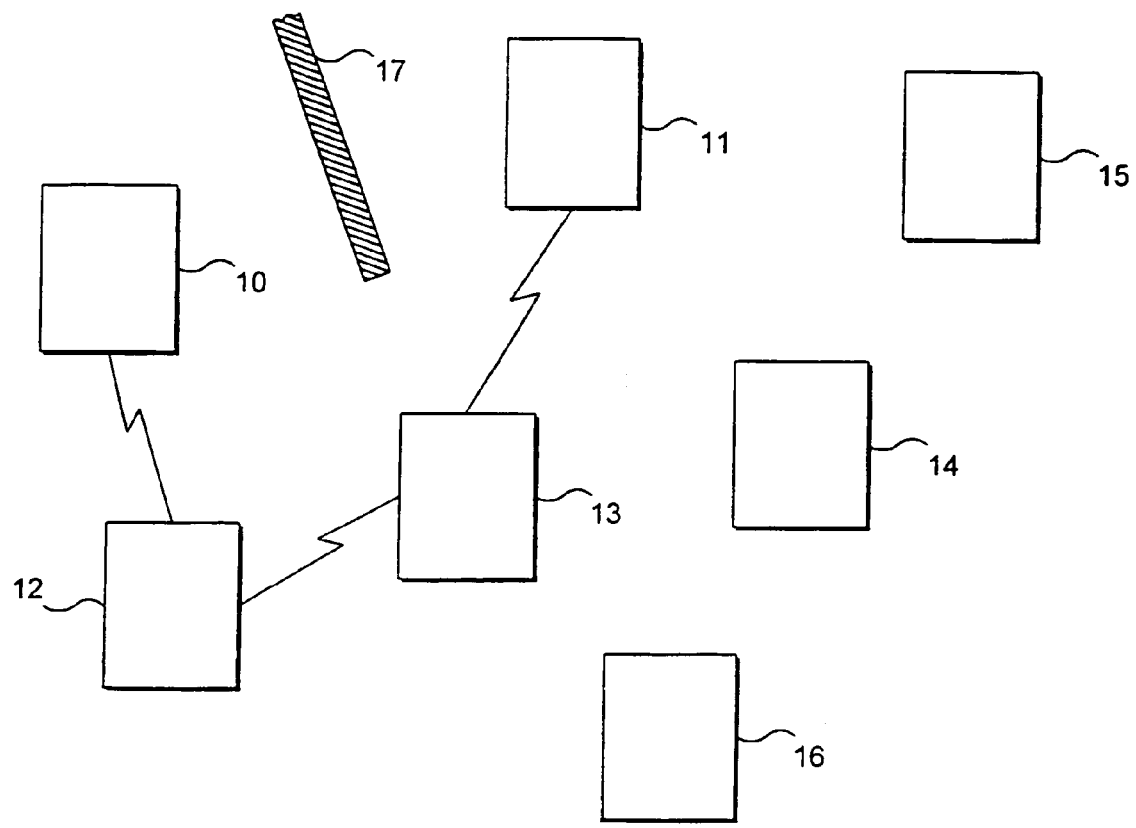
FIG. 2 illustrates a distributed network architecture.
Figure 3:
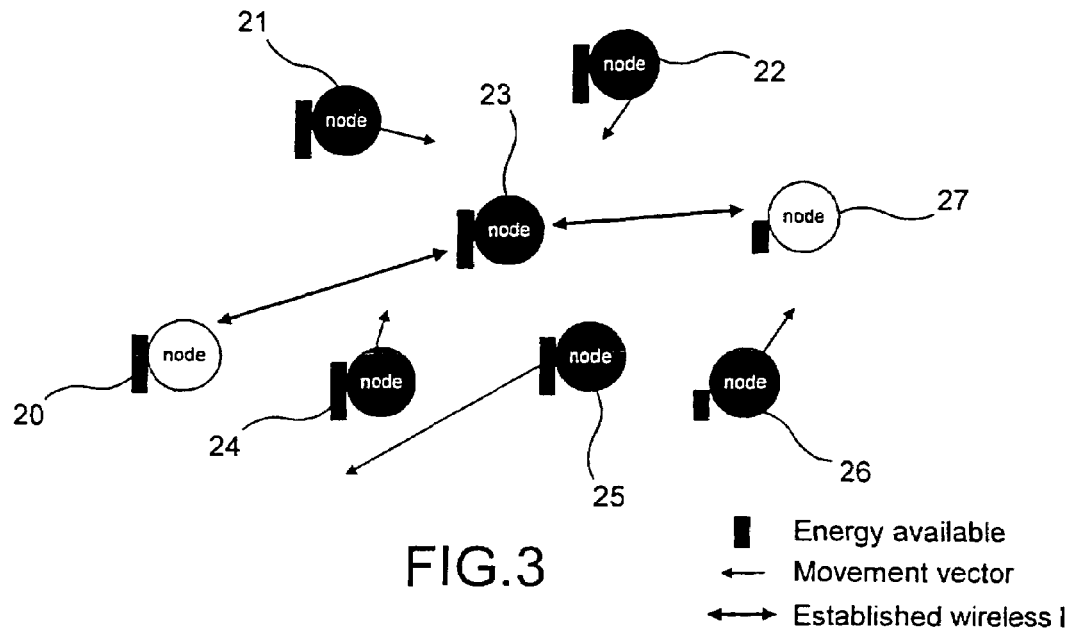
FIGS. 3 and 4 illustrate distributed network architectures having routing established on the basis of mobility and energy characteristics.

FIG. 3 illustrates a distributed or ad-hoc communication network including a plurality of terminals 20-27. Each terminal can communicate bi-directionally with each other terminal that is in range of it using a suitable communication protocol such as Bluetooth, HomeRF or IEEE 802.15. The terminals may therefore be considered to be peer units in the network. Each terminal could represent communication apparatus installed in a respective device such as a personal computer, a mobile telephone, a wrist watch, a television or an internet access unit (not shown). Communications between the devices are preferably but not necessarily wireless, for example by radio or optical (e.g. infra-red) communications.

Each terminal has a power source such as mains electricity, a battery, solar power or another means. Devices connected to mains electricity can draw on an effectively unlimited amount of energy but devices powered only by batteries have a strictly limited energy supply. The amount of energy available to communications terminals in battery powered devices may be limited also by the power consumption of other components of those devices and/or by expected minimum battery lifetimes, especially in devices such as wrist watches that have batteries of relatively low capacity. The amount of energy available to the communication terminal of a battery-powered device may also change over time as the battery is drained or recharged. In FIG. 3 the vertical bar next to each terminal indicates the amount of energy available to each terminal. Terminals 20-25 are powered by mains electricity (for practicality the energy available to them has been considered to have a high but limited value). Terminals 26 and 27 are powered by batteries and have much less available energy. Each terminal maintains a register storing data indicating the energy currently available to it.

Each terminal may be capable of moving relative to one or more of the other terminals. Such movement is indicated by vectors adjacent to terminals 21, 22, 24, 25 and 26 which indicate the direction and velocity of movement of the respective terminal. Each terminal maintains a register storing data indicative of its mobility characteristics. That may be its latest determined direction of movement, its latest determined velocity of movement, its latest determined direction and velocity of movement (all of which may be calculated for example by means of timing delays of received signals or by signal strength measurements or in other ways); and/or an indication of its mobility based on the type of the device (e.g. a relatively mobile wrist watch or a relatively fixed washing machine) and/or the status of the device (e.g. a relatively fixed device when in a recharging station or a relatively mobile device when being worn by a user).

Each terminal has an identity code that can be used to identify it uniquely. Each terminal maintains a record of the identities of terminals with which it can communicate, for example by monitoring broadcast signals as described above, and periodically transmits such broadcast signals for detection by other terminals.

FIG. 3 illustrates the establishment of a communication link between terminals 20 and 27. Terminal 20 represents the communication terminal of a mains-powered internet connection device. Terminal 27 represents the communication terminal of a battery-powered wrist watch.

Terminal 20 initiates the establishment of the communication link by a network probing process. Terminal 20 knows the identity of terminal 27, and checks its record of terminals with which it can communicate to determine whether terminal 27 is one of them. Terminal 20 also enquires of those terminals with which it can communicate whether they can communicate with terminal 27, and those terminals may make a corresponding enquiry of the terminals with which they can communicate. The enquiry process continues to, for example, a preset depth of recursion in terms of hops away from the initiating terminal.

Where a potential communication route to terminal 27 is found that route is reported back to terminal 20 by the terminals that form the route. The terminals also report their energy and mobility characteristics—for example each terminal's amount of stored energy available for use in supporting the requested link and current movement vector expressed as a direction and velocity. On the basis of this information the terminal 20 that is initiating the establishment of the link determines which route is to be selected for communication with destination terminal 27.

Terminal 20 takes account of the returned energy and mobility characteristics in determining which route is to be selected. According to pre-set weighting parameters terminal 20 selects the route to provide a compromise between: (1) preserving energy reserves in devices having limited available energy, and (2) link stability, which may be reduced by including in the selected route devices that are more likely to move out of the route (e.g. fast-moving or highly mobile devices). The weighting parameters may be determined empirically so as to achieve a desired level of performance in the network. In the situation shown in FIG. 3 this results in the selection of a communication route via node 23, which is stationary and has large available power due to its mains power supply.

Terminal 20 then establishes the link over the selected route. Terminals 20 and 27 are the end units of the link that is established. Terminal 23 is an intermediate node in the link.

The same route may be used for communications in both directions—in which case the destination terminal may simply accept the route selected by the initiating terminal. Alternatively, the destination terminal may independently decide on a route for communications from it to the initiating terminal. On being informed that the communication link with the initiating terminal is to be established the destination terminal may begin a network probing process analogous to that performed earlier by the initiating terminal, in order to gather information on available links with the initiating terminal. The destination terminal may then analyse the received information, again taking account of the returned energy and mobility characteristics to determine a route.

Figure 5:
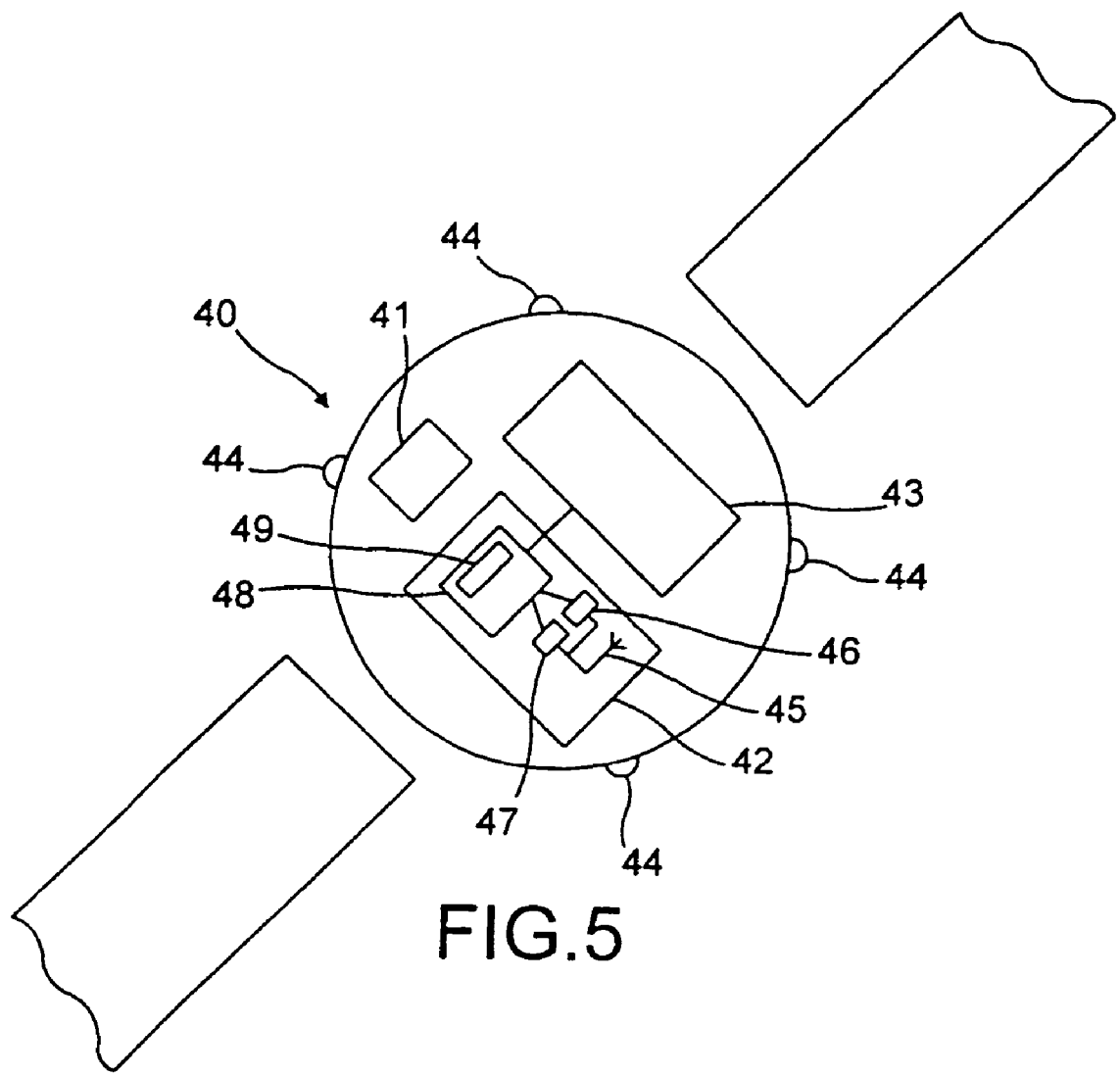
FIG. 5 illustrates a wrist-watch including a communication sub-system.

Each terminal may include routing means for initiating probing of the network, storing the results, analysing the results and applying a decision-making strategy as described above. Such means may be included in central processing means of the terminal. For example, FIG. 5 illustrates a wrist-watch 40 including time-keeping circuitry 41, a communications terminal subsystem 42, a display 43 and input push buttons 44. Terminal subsystem 42 includes an antenna 45. Antenna 45 for reception of signals provides input to a reception filter/amplifier arrangement 46 and for transmission of signals receives output from a transmission filter/amplifier arrangement 47. Processing unit 48 provides input to the transmission arrangement 47 and is arranged to receive output from the reception arrangement 46. Processing unit 48 is connected to the time-keeping circuitry 41. Processing unit 48 includes the routing means 49 which may be provided as dedicated hardware or as stored software instructions for execution in the processing unit 48.

In addition to energy and mobility characteristics the initiating terminal and/or the destination terminal may take direct or indirect account of required transmission power for the hops in each potential route that is considered. This may be done by the nodes of potential routes additionally reporting information that enables required transmission power to be estimated. Such information may, for example, be the nodes' locations (from which the power for communications between them may be estimated using preset attenuation characteristics) or a previously determined value for a required transmission power to support satisfactory communications from the respective node to the next node in the proposed route. Reception power may be similarly taken into account since, due for example to polling message information, also requires quite a relatively large amount of energy in LPRF devices, for example due to power consumption by RF synthesizers. These strategies enable further optimisation of the forward and return routes.

It may also be preferable to take account of factors that may tend to affect the frequency of handovers. For example, where one of the end-points of the route or one of the intermediate points of the route is a mobile terminal, preference may be given to an adjacent terminal in the route having a relatively large coverage area. Similarly, if the initiating terminal has a choice of end-points (for example a number of nearby internet connection nodes) preference may be given to it selecting an end-point associated with a relatively large coverage area. These preferences may be expressed by the use of appropriate weighting factors. If a mobile node acts as an intermediate router/bridge in a route then it may be preferred to use a mobile router instead of a static router to carry the signals to a place having coverage to another network such as a wireline network.

Intermediate devices in a route may have involvement in determining the route that is to be used. Such involvement may be in the selection of a route—in which case it replaces at least some functionality of the initiating terminal as described above—and/or in rejection of a route that has been proposed or even established. A device that is included in a route may decide to terminate its services as a router/bridge in that route in dependence on its circumstances: for example if its stored energy falls below a threshold or if it needs to adopt another function such as initiating or receiving a communication itself. Such termination may also be dependant on the nature of the communications that are being carried over the initial route (for example whether those communications represent an emergency call, or whether the intermediate device is earning payment for its routing services) and the capacity of the intermediate device.

The representation of energy stored by an intermediate node is preferably a representation of the physical energy available for use by the node, for example its remaining battery lifetime at current or projected power usage.

Figure 4:
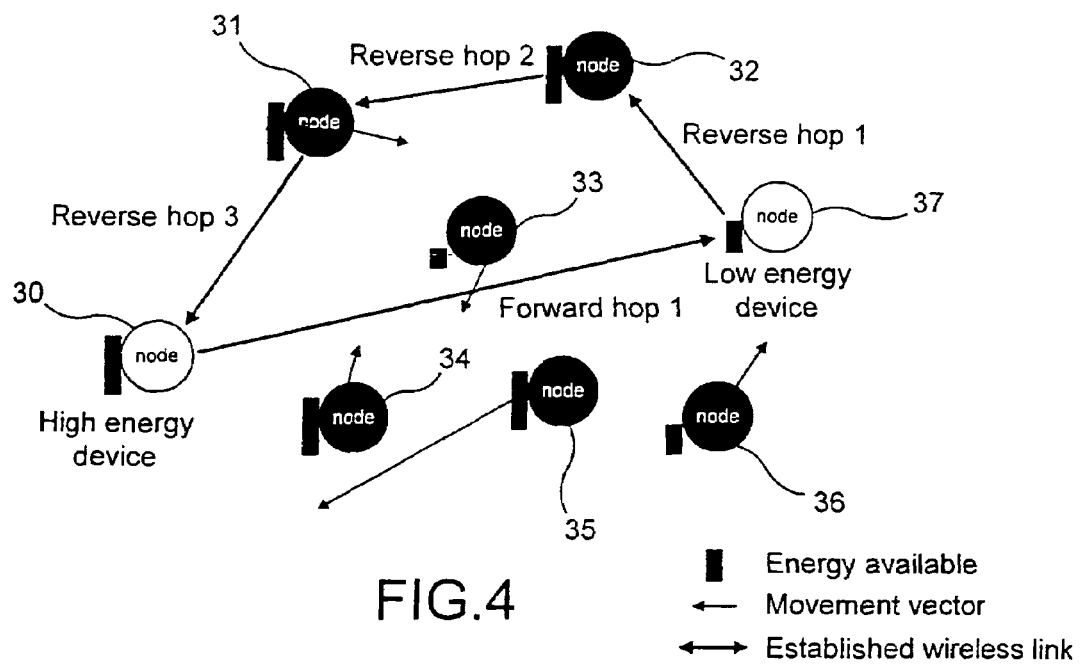

FIG. 4 illustrates a communication network including terminals 30-37 illustrated in the fashion described above with reference to FIG. 3. In the network of FIG. 4 use is made of independent decision-making for forward and reverse routes, and information on required power. According to pre-set weighting parameters initiating terminal 30 and destination terminal 37 independently select routes between them in order to provide a compromise between preserving energy reserves in devices having limited available energy, and link stability. In evaluating preservation of energy reserves, account is taken of both available energy of each node and expected power consumption of each node to support each proposed route.

In the network illustrated in FIG. 4 terminals 33 and 37 are battery-powered and have severely limited available energy. Terminals 30, 31 and 32 are mains-powered. Available routes in either direction between terminals 30 and 37 are:

30-37
30-31-32-37
30-33-37

Route 30-37 involves the fewest hops (and therefore least expected transmission delay), but since terminals 30 and 37 are relatively far apart it requires substantial transmission power. Route 30-31-32-37 involves the most hops, but since terminal 37 is relatively close to terminal 32 it requires relatively little transmission power over that hop. Route 30-33-37 provides the shortest path between the terminals and under a traditional routing scheme may have been considered to minimise power consumption. Using the decision-making scheme described above route 30-37 is selected for the link in the direction from terminal 30 to terminal 37 since terminal 30 is mains-powered and the substantial transmission power needed over that link is not a significant limitation to it. Route 30-31-32-37 involves an increased number of hops over route 30-37 and is therefore less preferred. Route 30-33-37 involves consumption of power by energy-limited terminal 33 and is therefore less preferred. Route 37-32-31-30 is selected for the link in the direction from terminal 37 to terminal 30, since this minimises power consumption by energy-limited terminal 37 albeit at the expense of an increased number of hops.

Routing according to the procedures described above offers a number of advantages over prior systems. By taking account of available energy of nodes in potential communication routes the procedure allows for increased battery life and reduced size of battery-powered devices that include communication facilities. By taking account of energy characteristics and mobility characteristics and optionally other factors including any or all of number of hops, required power over each hop (suitably together with available energy) and total power usage—as described above—an appropriate compromise between factors such as link stability, power consumption, battery life and transmission delay may be reached.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

What is claimed is:

1. A method for routing communications in a communications system, the method comprising:
providing a plurality of communication nodes in the communications system, each node transmitting signals to and receiving signals from one or more other nodes, and including a first node, a second node and a plurality of other nodes;
selecting a route to communicate from the first node to the second node by way of at least one of the other nodes based on energy characteristics of each of the other nodes; and
selecting a route to communicate from the first node to the second node by way of at least one of the other nodes based on mobility characteristics of each of the other nodes, wherein the energy characteristics include the energy available to each of the other nodes.

2. A method as claimed in claim 1, further comprising:
routing communications from the second node to the first node by way of at least one of the other nodes on the basis of energy characteristics of each of the other nodes.

3. A method as claimed in claim 2, further comprising:
performing said routing of communications from the second node to the first node independently of routing of communications from the first node to the second node.

4. A method as claimed in claim 3, wherein the mobility characteristics include the current velocity of each of the other nodes.

5. A method as claimed in claim 4, wherein the mobility characteristics include the current direction of each of the other nodes.

6. A method as claimed in claim 1, wherein the energy characteristics include the energy available to each of the other nodes for transmission of signals to other nodes.

7. A method as claimed in claim 1, wherein the energy characteristics include the power required for transmission of signals to those other nodes.

8. A method as claimed in claim 7, wherein the power is determined as a function of the distance between the nodes.

9. A method as claimed in claim 1, wherein the energy characteristics include the energy available to each of the other nodes for reception of signals from other nodes.

10. A method as claimed in claim 9, wherein the energy characteristics include the power required for reception of signals from those other nodes.

11. A method as claimed in claim 10, wherein the power is determined as a function of the distance between the nodes.

12. A method as claimed in claim 1, wherein the signals are wireless signals.

13. A method as claimed in claim 1, wherein the signals are radio signals.

14. A communications system, comprising:
a plurality of communication nodes, each node configured to transmit signals to and receive signals from one or more other nodes, and including a first node, a second node and a plurality of other nodes;
a router configured to route communications from the first node to the second node by way of at least one of the other nodes based on available energy of each of the other nodes; and
a terminal unit configured to select a route to communicate from the first node to the second node by way of at least one of the other nodes based on mobility characteristics of each of the other nodes.

15. A communication system as claimed in claim 14, wherein the router is configured to route communications from the first node to the second node by way of at least one of the other nodes based on a mobility of each of the other nodes.

16. A communication terminal to operate as a first node in communications system comprising a plurality of communication nodes, the communication terminal comprising:
a router configured to route communications from the first node to a second node by way of at least one of other nodes based on available energy of each of the other nodes, wherein each node in the communications system is configured to transmit signals to and receive signals from the other nodes, and the communications system include the second node and the plurality of other nodes; and
a terminal unit configured to select a route to communicate from the first node to the second node by way of at least one of the other nodes based on mobility characteristics of each of the other nodes.

17. A communication terminal as claimed in claim 16, wherein the router is configured to route communications from the first node to the second node by way of at least one of the other nodes based on a mobility of each of the other nodes.

18. A communications system, comprising:
a plurality of communication nodes, each node for transmitting signals to and for receiving signals from one or more other nodes, and including a first node, a second node and a plurality of other nodes;
routing means for routing communications from the first node to the second node by way of at least one of the other nodes based on available energy of each of the other nodes; and
terminal means for selecting a route to communicate from the first node to the second node by way of at least one of the other nodes based on mobility characteristics of each of the other nodes.

* * * * *